(12) United States Patent
Kashimba et al.

(10) Patent No.: US 9,680,883 B1
(45) Date of Patent: *Jun. 13, 2017

(54) TECHNIQUES FOR INTEGRATING VOICE CONTROL INTO AN ACTIVE TELEPHONY CALL

(71) Applicant: Bandwidth.com, Inc., Raleigh, NC (US)

(72) Inventors: Jared Kashimba, Micanopy, FL (US); Sai Rathnam, Raleigh, NC (US); Matthews Abraham, Cary, NC (US); Andrew Gulino, Chapel Hill, NC (US); Charles Marcel Kinard, Cary, NC (US); Aaron Medford, Smithfield, NC (US); Justin Milam, Burgaw, NC (US); Travis Morton, Raleigh, NC (US); Jon Schniepp, Raleigh, NC (US); Brandon Smith, Cary, NC (US); Shawn Starler, Fuquay-Varina, NC (US); Greg Stephens, Cary, NC (US); Sam Thomas, Holly Springs, NC (US); Matthew Wood, Durham, NC (US)

(73) Assignee: REPUBLIC WIRELESS, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,906

(22) Filed: Sep. 13, 2016

Related U.S. Application Data

(63) Continuation of application No. 15/260,704, filed on Sep. 9, 2016, now Pat. No. 9,571,532.

(51) Int. Cl.
*H04L 29/06* (2006.01)
*H04M 1/253* (2006.01)
(Continued)

(52) U.S. Cl.
CPC ....... *H04L 65/1096* (2013.01); *G06Q 20/322* (2013.01); *G08C 17/02* (2013.01);
(Continued)

(58) Field of Classification Search
CPC .......... H04L 12/2493; H04L 29/12094; H04L 41/5087; H04L 29/06278; H04L 29/06394;
(Continued)

(56) References Cited

U.S. PATENT DOCUMENTS 9,570,075 B1 * 2/2017 Kashimba ........... G10L 15/1822
9,571,532 B1 * 2/2017 Kashimba ........... G10L 15/1822
(Continued)

*Primary Examiner* — Benjamin H Elliott, IV
(74) *Attorney, Agent, or Firm* — Gregory Stephens

(57) ABSTRACT

Examples are disclosed for responding to voice commands within an existing telephony call between two or more end user communication devices mediated by an IP based communications server. The server is mediating a telephony call among the two or more end user communication devices where each end user communication device has its own communication link to the server. The server may detect a trigger event from one of the end user communication devices. Upon detecting the trigger event, the server may receive voice input over the communication link from the end user communication device that generated the trigger event. The received voice input may be parsed into one or more voice commands. The server may then cause the one or more voice commands to be executed. In other embodiments, much of the intelligence and processing may be carried out on the end user communication device directly.

29 Claims, 6 Drawing Sheets

(51) Int. Cl.
*G06Q 20/32* (2012.01)
*G08C 17/02* (2006.01)
*H04W 4/14* (2009.01)
*H04M 7/00* (2006.01)

(52) U.S. Cl.
CPC ....... H04M 1/2535 (2013.01); *H04L 65/1093* (2013.01); *H04M 7/0054* (2013.01); *H04M 2201/40* (2013.01); *H04M 2203/2072* (2013.01); *H04M 2242/12* (2013.01); *H04W 4/14* (2013.01)

(58) Field of Classification Search
CPC ..... H04L 65/1046; G19L 17/00; G10L 21/00; H04M 1/72563; H04M 7/0048; H04M 2250/52; H04M 1/2535; H04M 7/006
See application file for complete search history.

(56) References Cited

U.S. PATENT DOCUMENTS

| | | | |
|---|---|---|---|
| 2015/0074616 A1* | 3/2015 | Hokyung | G06F 1/3206 715/863 |
| 2015/0379993 A1* | 12/2015 | Subhojit | G10L 15/06 704/275 |

* cited by examiner

100

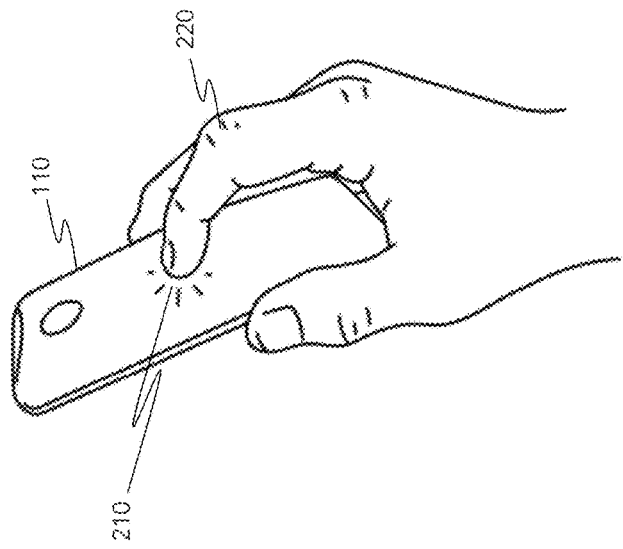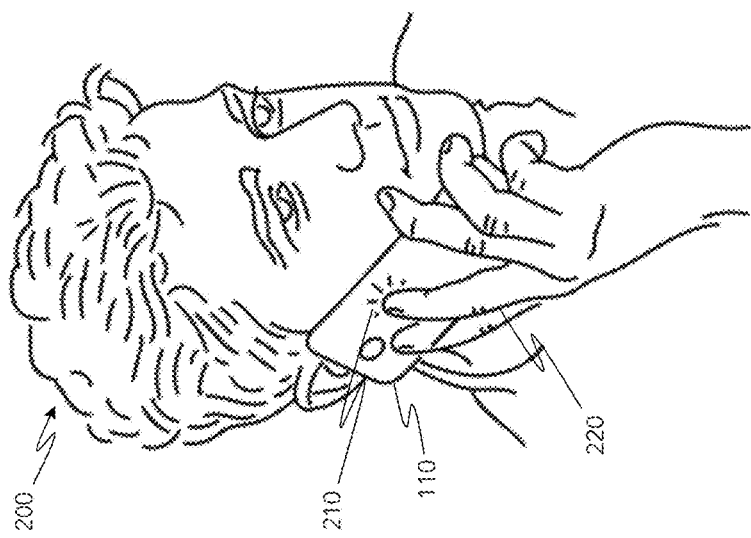

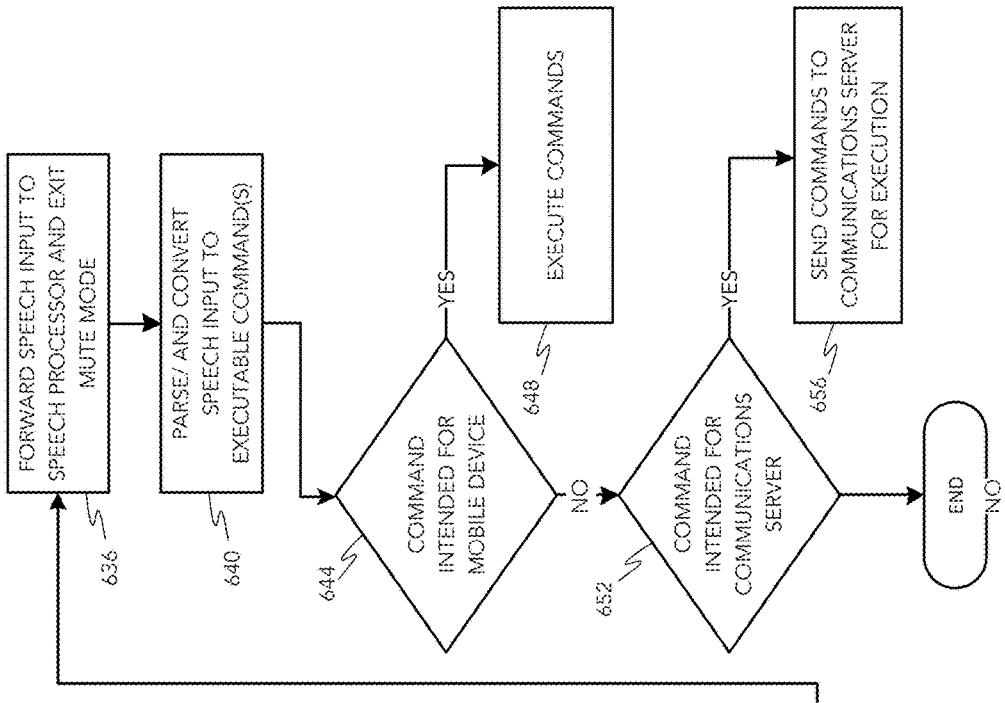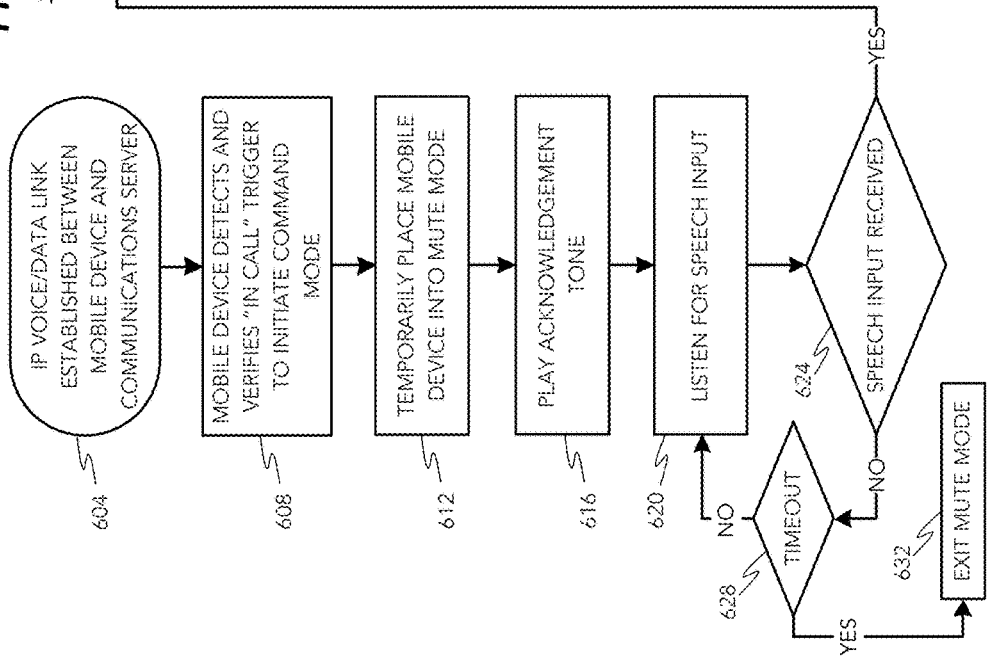
FIG. 6
600

700

TECHNIQUES FOR INTEGRATING VOICE CONTROL INTO AN ACTIVE TELEPHONY CALL

CROSS-REFERENCE TO RELATED APPLICATIONS

This application is a continuation of U.S. application Ser. No. 15/260,704 filed on Sep. 9, 2016 entitled, "Techniques For Integrating Voice Control Into An Active Telephony Call".

TECHNICAL FIELD

Examples described herein are generally related to techniques for integrating voice control into an existing telephony call.

BACKGROUND

Mobile telephony devices (often called smartphones) utilizing wireless communication protocols are ubiquitous. Many of these devices utilize one of the competing circuit switched cellular voice protocols (e.g., Global System for Mobile Communications (GSM) or Code Division Multiple Access (CDMA)) for telephony voice communications with other telephony endpoint devices. More recently, many of these mobile telephony devices may also utilize an Internet Protocol (IP) communication link rather than a circuit switched communication link to exchange voice data with a communications server using a Voice-over Internet Protocol (VoIP) system. The communications server mediates telephony calls between and among various endpoints. In addition, the mobile telephony device may also wirelessly connect to an IP network over one or more wireless IP interfaces and communication links.

The IP communication link may be 802.11 based such as WiFi or may be cellular based utilizing at least one of the many cellular IP air interfaces. There are several cellular IP air interfaces already in existence that use specific frequency ranges that are suitable for use with the embodiments described herein. It should be noted that the term 802.11 encompasses all of the 802.11 versions that currently exist and may be developed. Some examples include the General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), and High Rate Packet Data (HRPD). Moreover, there are many more wireless IP air interfaces in the planning and/or experimental stages (e.g., 5G, light-wave based, etc.) that use the same and/or different frequencies that would also be suitable for use with the embodiments described herein.

Some mobile telephony devices are capable of utilizing multiple different networks depending on network access or network conditions. For instance, the mobile telephony device may be able to communicate with a communications server that manages and mediates telephony calls over either a circuit switched network or an IP based network. The communications server may be IP based but with interfaces to cellular circuit switched networks or the public switched telephone network (PSTN) as well as Voice-over Internet Protocol (VoIP) networks. If the communications server is IP based, it may include additional intelligence that allows it access other IP data networks like the Internet in general to engage in IP data sessions. Moreover, the communications server may access other IP data networks while simultaneously managing a telephony call between or among a plurality of telephony endpoint devices. The mobile telephony device(s) are also able to access IP data networks such as the Internet over 802.11 WiFi and/or a cellular IP data connection. What is needed is a mechanism for accessing and leveraging the communication server's ability to utilize IP data networks during a voice communication session.

BRIEF DESCRIPTION OF THE DRAWINGS

FIG. 2A illustrates a user initiating a command mode during a call according to an embodiment of the invention.

FIG. 2B illustrates another view of a user initiating a command mode during a call according to an embodiment of the invention.

FIG. 6 illustrates another example of a logic flow diagram according to an embodiment of the invention.

DETAILED DESCRIPTION

Figure 1:
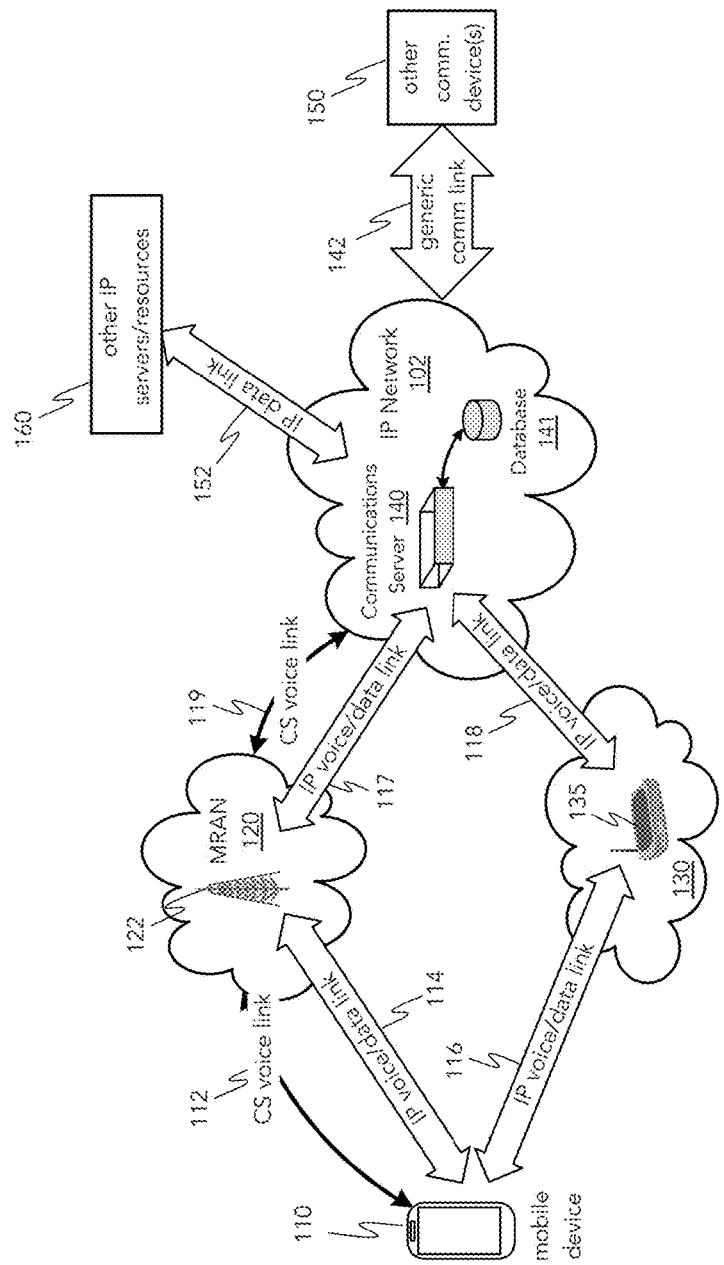
FIG. 1 illustrates an example block diagram for a networked environment.

The embodiments described herein disclose systems, methods, and computer program products for integrating a voice controlled IP data session into an existing telephony call. The systems and methods of the invention may be embodied in and performed by mobile telephony devices, other telephony endpoints, network based communications server(s) and other related components (e.g., databases), and software instructions executed by some or all of such devices and components, as will be explained in detail below. The different types of networks contemplated herein include, for example, circuit switched networks, IP based cellular mobile networks, and IP data networks, such as the Internet or other IP-based networks, including wide area networks, local area networks, and combinations thereof that include both wireless (e.g., 802.11) and wireline (e.g., Ethernet) means of access.

As used herein the term "telephony endpoint" is meant to generally indicate an end user physical device intended for, among other things, telephony calls to other telephony endpoints over one or more inter-connected telephony networks. Examples of telephony endpoints include a plain old telephone service (POTS) phones, VoIP telephones, mobile/cellular telephones, and software based soft-client applications executing on a computer device. Other examples may be understood to those of ordinary skill in the art.

As used herein the term "mobile telephony device" is meant to generally indicate a specific type of telephony endpoint, namely a mobile or cellular telephone such as a smartphone that may be equipped with multiple RF transceivers including an 802.11 WiFi transceiver, a cellular banded transceiver, and (optionally) a Bluetooth transceiver. Other similar RF transceivers configured to use various frequency ranges may also be implemented on the mobile telephony device as they are developed.

As used herein the term "telephony call" is meant to generally indicate any two-way exchange of voice data between two or more telephony endpoint devices.

As used herein, the term "communications server" is intended to mean an IP based computer that, among other capabilities, mediates and manages telephony calls among telephony endpoints over one or more inter-connected telephony networks.

As used herein, the term "communication link" is intended to mean a physical and/or logical channel that connects two or more telephony endpoints with the IP based communications server. A communication link may be a signaling link, a media link, or both. In this context, a telephony call may be established via one or more communication links in which the IP based communications server is an endpoint for each of the communication links. The IP based communications server may then join one or more communication links together to establish a telephony call between or among two or more telephony endpoints. The IP based communications server may be hosted within an IP network accessible to the Internet.

References herein to a mobile telephony device capable of connecting to or communicating via a mobile radio access network (MRAN) refer to a mobile telephony device equipped with a cellular transceiver for wireless communication with basestations for purposes of accessing circuit switched voice services and/or mobile IP data services. Similarly, references herein to a mobile telephony device capable of connecting to or communicating via an IP data network refer to a mobile telephony device equipped with a transceiver for wireless communication (e.g., 802.11 WiFi) with a router or other IP data network access point.

Certain embodiments herein describe techniques for the user of a telephony device to signal to the IP based communications server to listen for voice commands that the communications server may then execute all while maintaining the existing telephony call.

FIG. 1 illustrates an exemplary networked environment 100 for implementing certain exemplary embodiments described herein. The networked environment 100 may include multiple distinct inter-connected networks such as, for instance, a large scale internet protocol (IP) network (e.g., the Internet) 102, one or more IP based local area networks or wide area networks (LANs/WANs) 130 including an 802.11 wireless access point 135, and one or more MRANs 120 accessible via a cellular basestation tower 122.

It should be noted that alternative wireless IP based networks (not shown) that do not operate over the frequency spectrum typically associated with 802.11 (e.g., WiFi) or cellular may be implemented. One example of such an alternate wireless IP network may be WiMAX (e.g., 802.16). Other examples may include, but are not limited to, networks utilizing television whitespace frequencies and other unlicensed (or yet to be licensed) frequencies, including, but not limited to, those under consideration for 5G implementations. These may include wireless networks operating within a frequency range of 100 MHz and 700 MHz, and wireless networks operating within a frequency range of 3.5 GHz and 3.7 GHz, and anything at or above 5 GHz including light-wave based transmission systems.

The MRANs 120 and the LANs 130 each have backhaul IP connectivity to the Internet 102 that provides connectivity with a communications server 140. The communications server 140 has many capabilities including: (i) an ability to manage and mediate telephony calls between or among telephony endpoints, and (ii) an ability to manage and mediate IP data sessions between or among other IP enabled devices.

The MRAN 120 (sometimes referred to as a cellular network) may come in different varieties based on the circuit switched radio transmission protocol it supports. Two such circuit switched radio transmission schemes are the Global System for Mobile Communication (GSM) and Code Division Multiple Access (CDMA). These circuit switched radio transmission schemes are incompatible with one another necessitating an intervening interface to allow communication between mobile telephony devices 110 on either network. In addition, each network may operate over multiple specific frequency ranges. Often, there may even be an intervening network such as the Public Switched Telephone Network (PSTN) (not shown) between two distinct MRANs. Each MRAN 120 may include an interface to the PSTN (not shown) such that telephony calls crossing that interface can be handled by the receiving network whether it is an MRAN 120 or the PSTN.

The MRAN 120 may also provide mobile telephony devices 110 with wireless IP based data access to the Internet 102 using one of the aforementioned cellular IP protocols. Moreover, MRANs 120 may utilize IP protocols like Voice-over LTE (VoLTE) to enable telephony calling over an IP protocol rather than a circuit switched protocol. Similarly, an IP access point 135 may provide wireless connectivity for a mobile telephony device 110 to the Internet 102 via access point 135 using any of the 802.11 WiFi standards and/or any other type of IP based connectivity standard.

In certain embodiments, MRANs 120 include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other existing or developed cellular network IP standards.

In normal operation, a mobile telephony device 110 may make and receive telephony calls. All calls are, at some point, routed through the communications server 140 residing in an IP network 102. Depending on location and current network conditions, the mobile telephony device 110 may communicate with the communications server 140 over (i) a WiFi IP voice/data link 116, 118 via an IP access point 135, (ii) a cellular IP voice/data link 114, 117 via a basestation 122 coupled to MRAN 120, or (iii) a circuit switched voice link 112, 119 via basestation 122 coupled to MRAN 120. Communications server 140 may also include a database 141 containing data on service subscribers it manages.

For telephony calls, the communications server 140 may also establish a secondary communication link 142 with another communication device 150 to establish the telephony call. The secondary communication link 142 is VoIP based with respect to the communications server 140 but may traverse other interconnected voice networks such as another MRAN, the PSTN, another VoIP network, or some combination thereof before terminating at the other communication device 150.

For reasons that will become clear later, the communications server 140 may also be capable of communicating with other IP servers/resources 160 over another IP data link 152. For example, the communications server 140 may be programmed to 'listen' to an existing telephony call and identify a trigger event that causes the mobile telephony device 110 to enter a mute state with respect to the existing call but a command state with respect to the communications server 140. Once in the command state, the mobile telephony device 110 user may give verbal instructions to the communications server 140 while still engaged on a telephony call.

FIG. 2A illustrates a user 200 initiating a command mode during a call according to an embodiment of the invention. User 200 is holding the mobile telephony device 110 next to his ear while conversing with another telephony endpoint via the communications server 140. The communications server 140 is constantly listening for a particular non-verbal trigger event from mobile telephony device 110. Making the trigger a non-verbal acoustic event has the advantage of not notifying the other party that something is happening. An unusual spoken phrase as a trigger would be detected by the other party on the call and seem wildly out of place or context. Similarly, having to remove the phone from the user's ear in order to navigate and engage a touchscreen button would require them to lapse context in the conversation.

In this case, the trigger event may be detection of a succession or pattern of taps 210 to the external housing of the mobile telephony device 110. The taps 210 may be administered, for example, by one or more fingers 220 of the user's hand holding the mobile telephony device 110. Each tap 210 may make a unique sound that can be detected. To screen false positives, the trigger may be set to detect a quick succession of taps 210 rather than a single tap. One example of a trigger may be three taps within one second. Those of ordinary skill in the art will appreciate that the trigger pattern may be varied without departing from the spirit or scope of the embodiments described herein.

If the communications server 140 detects the trigger event, it causes mobile telephony device 110 to go into a mute mode with respect to the ongoing telephony call. Communications server 140 may also acknowledge detection of the trigger event by playing an acknowledgement tone back to mobile telephony device 110. At this point, the user may enter verbal commands or instructions that the communications server hears but the other party does not. The telephony call itself remains unchanged with the lone exception that one party, the mobile telephony device 110, is in mute mode temporarily with respect to the other communication device(s) 150. Once the instructions have been received and processed (as described later), the mobile telephony device 110 exits mute mode and resumes normal full duplex conversation with the other communication device(s) 150.

FIG. 2B illustrates another view of a user initiating a command mode during a call according to an embodiment of the invention. In this embodiment, the user need not keep the mobile telephony device 110 next to his ear to administer the taps 210. In addition, the user need not necessarily use a finger to administer the taps 210 though it is the most convenient mechanism. The communications server 140 can detect similar sounds from other types of taps. For instance, a tap may exhibit an acoustic signature that can be easily detected based on characteristics like frequency, duration, tone, etc. A fingernail tap may have a slightly different acoustic signature than the fleshy part of a finger tap yet each may be detected as a trigger event.

Figure 3:
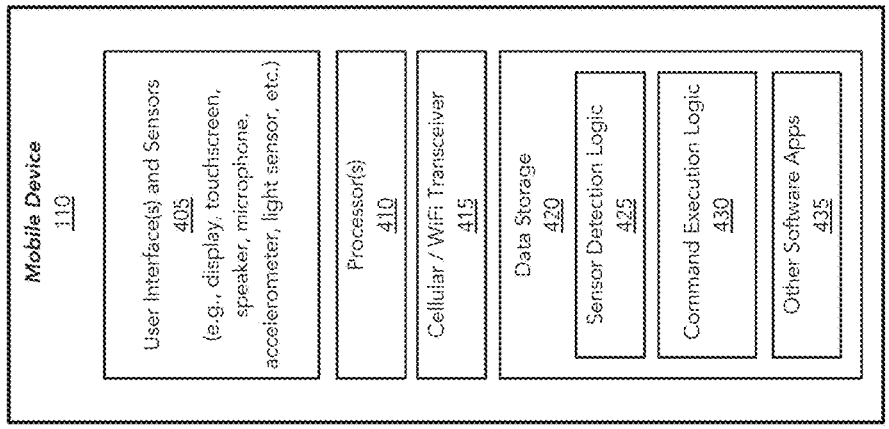
FIG. 3 illustrates a block diagram of a communications server according to an embodiment of the invention.

FIG. 3 illustrates a block diagram of a communications server 140 according to an embodiment of the invention. The communications server 140 may include one or more processors 305 coupled with a data storage component 310 comprised of a memory 315. The data storage component 310 may also include sensor detection logic 320 and command execution logic 325. A VoIP communication interface 330 manages and mediates telephony calls while an IP data interface 335 manages IP data sessions with external devices or programs. The VoIP communication interface 330 operates in an IP mode. However, it is capable of communicating with non-IP telephony networks via other integrated or external network interfaces.

The sensor detection logic 320 may be comprised of computer code that when executed monitors incoming data over the VoIP communication interface 330 and the IP data interface 335 during an existing call with another party. The sensor detection logic 320 monitors for a trigger event. A trigger event may take many forms including pattern matching to an acoustic signature. For instance, a set of taps to the housing of the mobile telephony device 110 creates a unique acoustic signature that may be detected and interpreted as a trigger event. One such unique acoustic signature may be the detection of three taps within a one second period in which the taps emit a sound within a particular frequency range.

The command execution logic 325 may be comprised of computer code that when executed recognizes the trigger event and causes the mobile telephony device 110 to enter a temporary command mode. Entering command mode initially places the mobile telephony device 110 into mute mode with respect to the ongoing telephony call with the other party. This may be performed locally on the communications server 140 or via an instruction sent to the mobile telephony device 110 from the communications server 140. Mute mode essentially blocks audio picked up from the mobile telephony device's microphone from being passed from the communications server 140 to the other communication device 150. Once mute mode is engaged, the mobile telephony device user may still speak into the device's microphone. The audio may still be digitized and sent to the communications server 140 over the telephony communication link for the existing telephony call. However, the communications server 140, being in command mode, treats the received audio differently. The communications server 140 parses the audio through the command execution logic 325 using natural language processing to recognize and interpret commands or instructions that may be carried out, or caused to be carried out, by the communications server 140.

Figure 4:
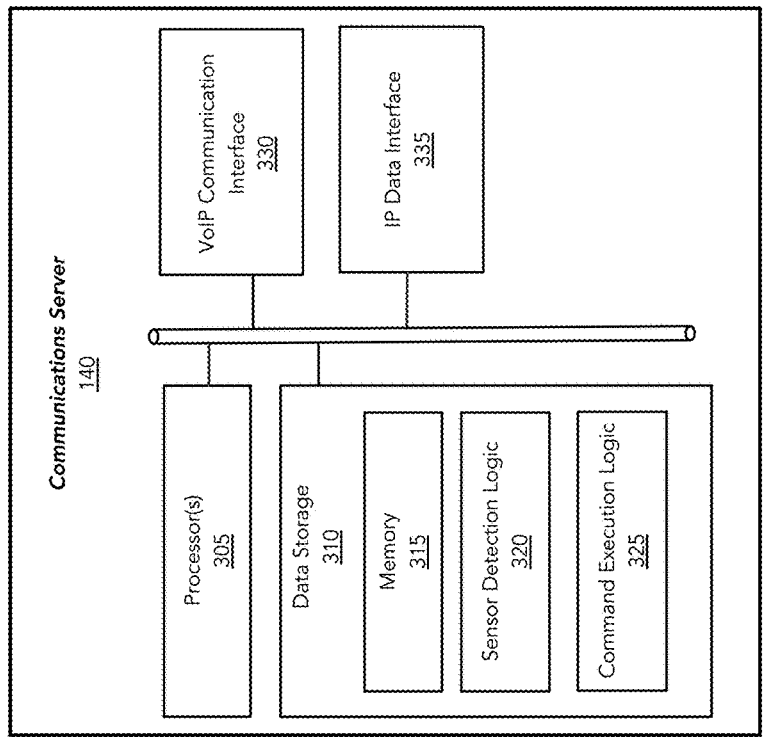
FIG. 4 illustrates a block diagram of an end user mobile telephony device according to an embodiment of the invention.

FIG. 4 illustrates a block diagram of an end user mobile telephony device 110 according to an embodiment of the invention. The mobile telephony device 110 may include a variety of user interface(s) and sensors 405 such as a touchscreen display, a speaker, a microphone, an accelerometer, a light sensor, etc. The mobile telephony device 110 may also include one or more processors 410 coupled with a data storage component 420 including sensor detection logic 425, command execution logic 430, as well as other software applications 435. The mobile telephony device 110 also comprises a cellular transceiver and a WiFi transceiver 415 for wireless communications with one or more wireless networks via wireless network access points (as shown in FIG. 1). The mobile telephony device 110 may include other wireless transceivers (not shown) like Bluetooth.

The sensor detection logic 425 may be comprised of computer code that when executed monitors incoming audio over the microphone for a trigger event. Just as above, a trigger event may take many forms including pattern matching to an acoustic signature. The command execution logic 430 may be comprised of computer code that when executed recognizes the trigger event and causes the mobile telephony device 110 to enter a temporary command mode. Entering command mode initially places the mobile telephony device 110 into mute mode with respect to the ongoing telephony call with the other party. This may be performed locally by the mobile telephony device 110 itself. Mute mode essentially blocks audio picked up from the mobile telephony device's microphone from being passed to the other communication device 150. Once mute mode is engaged, the mobile telephony device user may still speak into the device's microphone. The command execution logic 430 parses the audio using natural language processing to recognize and interpret commands or instructions that may be carried out, or caused to be carried out, by the mobile telephony device 110.

Figure 5:
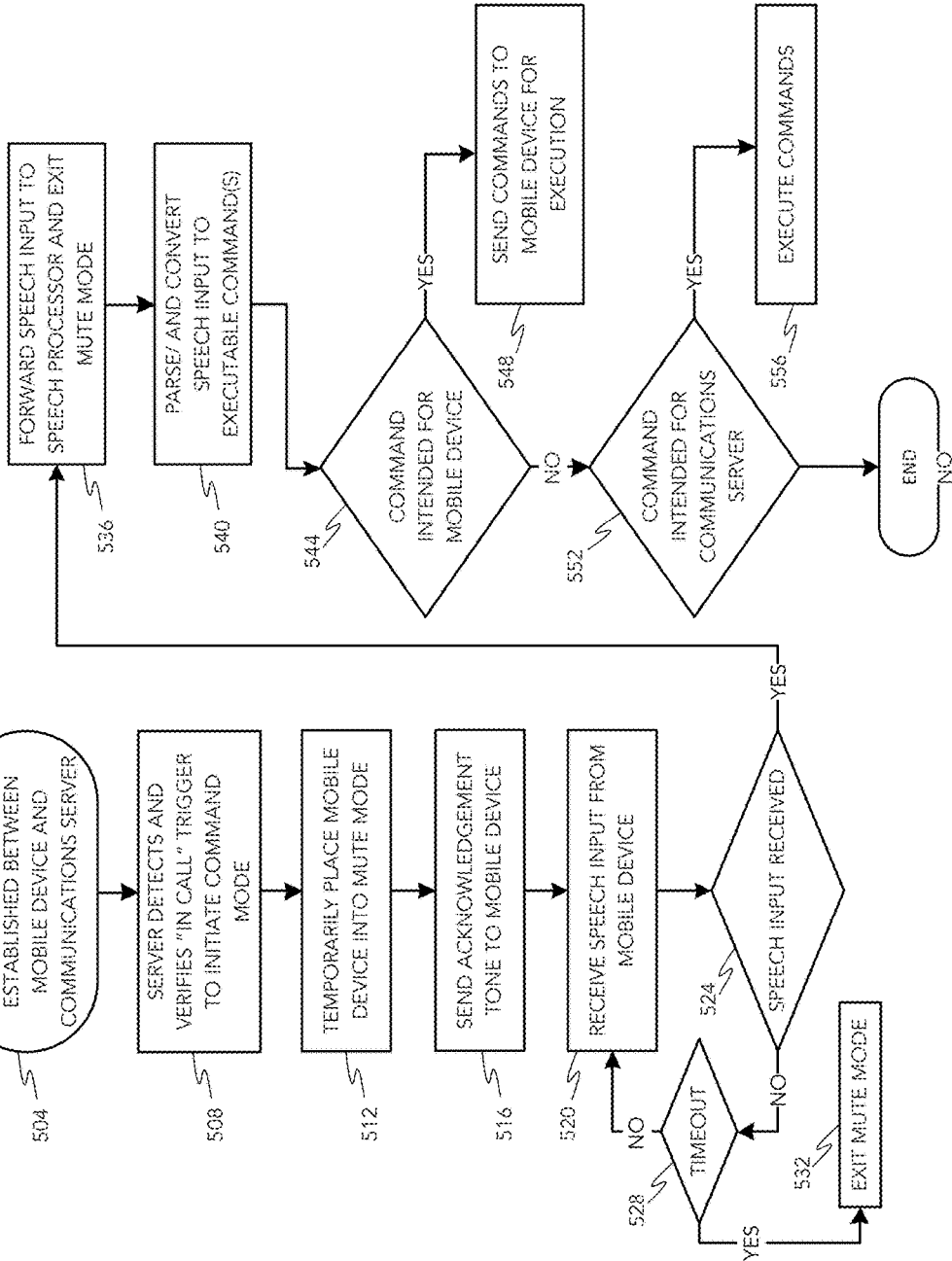
FIG. 5 illustrates an example logic flow diagram according to an embodiment of the invention.

FIG. 5 illustrates an example logic flow diagram 500 according to an embodiment of the invention. The logic flow 500 may be representative of some or all of the operations executed by one or more embodiments described herein. Further, the logic flow 500 may performed by circuitry and one or more components discussed herein. Moreover, logic flow 500 may be performed in conjunction with one or more other logic flows discussed herein and lists particular steps occurring in a particular order. However, embodiments are not limited in this manner and any step may occur in any order. Further, steps of logic flow 500 may not be dependent upon one another and as such particular steps in the logic flow 500 may not occur.

The logic flow 500 may be one example processing flow to cause a voice enabled command mode to be executed within a telephony call. In embodiments, the logic flow 500 may commence once an IP voice/data link has been established between a mobile telephony device 110 and a communications server 140 at block 504. For example, the communications server 140 has established a telephony call between the mobile telephony device 110 and another communication device 150 such that the IP voice/data link has been established between the mobile telephony device 110 and the communications server 140 as one leg of the telephony call.

In block 508, the communications server 140 detects and verifies an event trigger to initiate a command mode while in the telephony call. For example, the trigger event may be the acoustic signature of a set of taps to the housing of the mobile telephony device 110 that are picked up by the microphone. In one embodiment, the acoustic signature may constitute three taps within a particular frequency range within a one second period. Other acoustic signatures may be devised and implemented without departing from the spirit or scope of the overall invention. Once the trigger event is detected and verified, the mobile telephony device 110 is placed into mute mode at block 512. Next, an acknowledgment tone may be returned from the communications server 140 to the mobile telephony device 110 at block 516. The acknowledgment tone informs the user that the mobile telephony device 110 is now muted with respect to the telephony call. The user may now speak commands and the communications server 140 may receive speech input from the mobile telephony device 110 at block 520. The communications server 140 determines if any speech input is received at block 524 following initiation of command mode. If no speech input has been received as yet, a timeout function is checked at block 528. If the timeout value has not yet been exceeded, the communications server 140 continues to listen for input. If the timeout has been exceeded, the communications server 140 exits mute mode for the mobile telephony device 110 and resumes normal communications with the existing telephony call at block 532. Another acknowledgment tone may be played to the mobile telephony device 110 informing the user that the mobile telephony device 110 is no longer muted with respect to the telephony call.

If the communications server 140 does detect speech input from the mobile telephony device 110 at decision block 524, the speech input may be forwarded to a speech processor followed by exiting mute mode at block 536. The speech processor may perform natural language processing (or other processing) to parse the speech input into one or more executable commands at block 540. At decision block 544, it may be determined if the executable command(s) are intended to be performed by or on the mobile telephony device 110. If so, the commands may be sent to the mobile telephony device 110 for execution at block 548. If not, it may be determined if the executable command(s) are intended to be performed by or on the communications server 140 at block 552. If so, the commands may be executed by the communications server 140 at block 556. Otherwise, the voice command mode may be terminated and another acknowledgment tone may be played to the mobile telephony device 110 informing the user that the mobile telephony device 110 is no longer muted with respect to the telephony call.

FIG. 6 illustrates another example of a logic flow diagram according to an embodiment of the invention. The logic flow 600 may be representative of some or all of the operations executed by one or more embodiments described herein. Further, the logic flow 600 may performed by circuitry and one or more components discussed herein. Moreover, logic flow 600 may be performed in conjunction with one or more other logic flows discussed herein and lists particular steps occurring in a particular order. However, embodiments are not limited in this manner and any step may occur in any order. Further, steps of logic flow 600 may not be dependent upon one another and as such particular steps in the logic flow 600 may not occur.

The logic flow 600 may be one example processing flow to cause a voice enabled command mode to be executed within a telephony call. In embodiments, the logic flow 600 may commence once an IP voice/data link has been established between a mobile telephony device 110 and a communications server 140 at block 604. For example, the communications server 140 has established a telephony call between the mobile telephony device 110 and another communication device 150 such that the IP voice/data link has been established between the mobile telephony device 110 and the communications server 140 as one leg of the telephony call.

In block 608, the mobile telephony device 110 detects and verifies an event trigger to initiate a command mode while in the telephony call. For example, the trigger event may be the acoustic signature of a set of taps to the housing of the mobile telephony device 110 that are picked up by the microphone. In one embodiment, the acoustic signature may constitute three taps within a particular frequency range within a one second period. Other acoustic signatures may be devised and implemented without departing from the spirit or scope of the overall invention. Once the trigger event is detected and verified, the mobile telephony device 110 is placed into mute mode at block 612. Next, an acknowledgment tone may be played by the mobile telephony device 110 at block 616. The acknowledgment tone informs the user that the mobile telephony device 110 is now muted with respect to the telephony call. The user may now speak commands and the mobile telephony device 110 may receive the speech input at block 620. The mobile telephony device 110 determines if any speech input is received at block 624 following initiation of command mode. If no speech input has been received as yet, a timeout function is checked at block 628. If the timeout value has not yet been exceeded, the mobile telephony device 110 continues to listen for input. If the timeout has been exceeded, the mobile telephony device 110 is instructed to exit mute mode and resume normal communications with the existing telephony call at block 632. Another acknowledgment tone may be played by the mobile telephony device 110 informing the user that the mobile telephony device 110 is no longer muted with respect to the telephony call.

If the mobile telephony device 110 does detect speech input at decision block 624, the speech input may be forwarded to a speech processor followed by exiting mute mode at block 636. The speech processor may perform natural language processing (or other processing) to parse the speech input into one or more executable commands at block 640. At decision block 644, it may be determined if the executable command(s) are intended to be performed by or on the mobile telephony device 110. If so, the commands may be performed by the mobile telephony device 110 for execution at block 648. If not, it may be determined if the executable command(s) are intended to be performed by or on the communications server 140 at block 652. If so, the commands may be sent to the communications server 140 for execution by the communications server 140 at block 656. The communications server 140 may then determine if the commands need to be executed by other IP servers/resources 160. If so, the communications server 140 can issue queries or instructions to the other IP servers/resources 160 and await a response. In another embodiment, the mobile telephony device 110 may determine that the executable command(s) are intended to be performed by the other IP servers/resources 160. The executable command(s) may then be sent directly to the other IP servers/resources 160 and the mobile telephony device 110 may await a response.

Otherwise, the voice command mode may be terminated and another acknowledgment tone may be played by the mobile telephony device 110 informing the user that the mobile telephony device 110 is no longer muted with respect to the telephony call.

Figure 7:
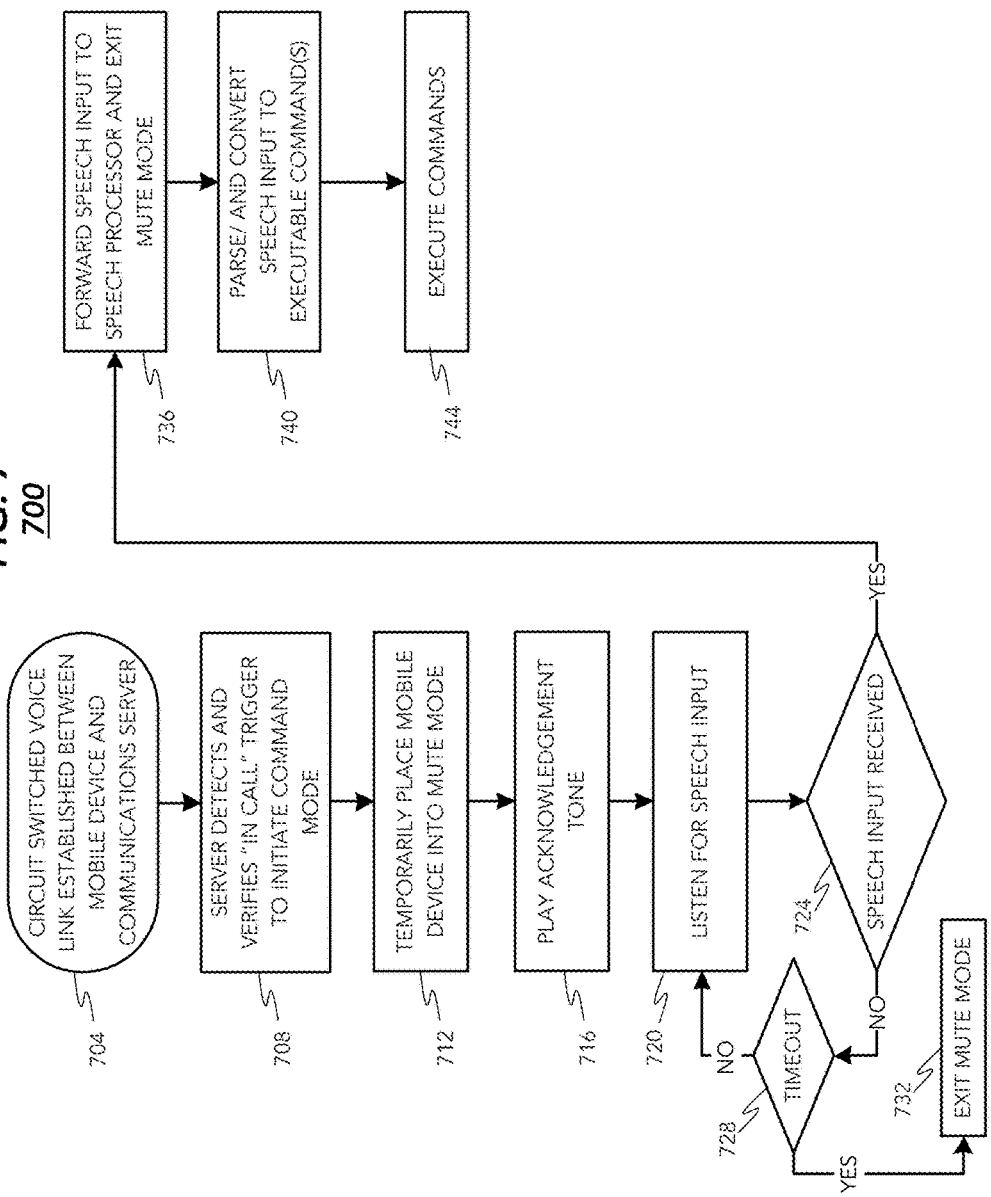
FIG. 7 illustrates still another example of a logic flow diagram according to an embodiment of the invention.

FIG. 7 illustrates still another example of a logic flow diagram according to an embodiment of the invention. The logic flow 700 may be representative of some or all of the operations executed by one or more embodiments described herein. Further, the logic flow 700 may performed by circuitry and one or more components discussed herein. Moreover, logic flow 700 may be performed in conjunction with one or more other logic flows discussed herein and lists particular steps occurring in a particular order. However, embodiments are not limited in this manner and any step may occur in any order. Further, steps of logic flow 700 may not be dependent upon one another and as such particular steps in the logic flow 700 may not occur.

The logic flow 700 may be one example processing flow to cause a voice enabled command mode to be executed within a telephony call. In embodiments, the logic flow 700 may commence once a circuit switched voice link has been established between a mobile telephony device 110 and a communications server 140 at block 704. For example, the communications server 140 has established a telephony call between the mobile telephony device 110 and another communication device 150 such that the circuit switched voice link has been established between the mobile telephony device 110 and the communications server 140 as one leg of the telephony call.

In an alternative embodiment, the logic flow 700 may commence once a circuit switched or IP voice link has been established between a POTS telephony device over the PSTN and the communications server 140 or a VoIP telephony device and the communications server 140. In other words, the initiating end user device need not be limited to a mobile telephony device 110.

In block 708, the communications server 140 detects and verifies an event trigger to initiate a command mode while in the telephony call. For example, the trigger event may be the acoustic signature of a set of taps to the housing of the mobile telephony device 110 that are picked up by the microphone. In one embodiment, the acoustic signature may constitute three taps within a particular frequency range within a one second period. Other acoustic signatures may be devised and implemented without departing from the spirit or scope of the overall invention. Once the trigger event is detected and verified, the mobile telephony device 110 is placed into mute mode at block 712. Next, an acknowledgment tone may be returned from the communications server 140 to the mobile telephony device 110 at block 716. The acknowledgment tone informs the user that the mobile telephony device 110 is now muted with respect to the telephony call. The user may now speak commands and the communications server 140 may receive speech input from the mobile telephony device 110 at block 720. The communications server 140 determines if any speech input is received at block 724 following initiation of command mode. If no speech input has been received as yet, a timeout function is checked at block 728. If the timeout value has not yet been exceeded, the communications server 140 continues to listen for input. If the timeout has been exceeded, communications server 140 exits mute mode for the mobile telephony device 110 and resumes normal communications with the existing telephony call at block 732. Another acknowledgment tone may be played to the mobile telephony device 110 informing the user that the mobile telephony device 110 is no longer muted with respect to the telephony call.

If the communications server 140 does detect speech input from the mobile telephony device 110 at decision block 724, the speech input may be forwarded to a speech processor followed by exiting mute mode at block 736. The speech processor may perform natural language processing (or other processing) to parse the speech input into one or more executable commands at block 740. The executable command(s) may be performed by or on the communications server 140 at block 744 and another acknowledgment tone may be played to the mobile telephony device 110 informing the user that the mobile telephony device 110 is no longer muted with respect to the telephony call.

EXAMPLE USE CASES

The logic flows above may be used to implement a virtually infinite number of use cases. What follows is a brief description of some potential use cases that may be implemented using one or more of the logic flows of FIGS. 5-7. The list is exemplary and not intended to be all inclusive. Those of ordinary skill in the art could readily discern additional uses cases that utilize the logic flows and architecture of FIGS. 1-7.

In each of the following example embodiments, it is assumed that an acknowledgment such as a tone or haptic feedback (e.g., vibration) indicating the mobile telephony device has been muted with respect to the existing telephony call and either the mobile telephony device 110 or communications server 140 is in a command mode awaiting voice input from a user of the mobile telephony device 110. The voice input, once processed, may be indicative of commands or instructions the user wishes to be executed while the telephony call is ongoing.

The natural language processor may discern the intent of the phrase or there may be a set of specific command words and syntax that are pre-associated with instructions to be carried out by the communications server 140 and/or the mobile telephony device 110. In some embodiments the natural language processor and the command execution logic 325, 430 may both be performed by either the communications server 140 or the mobile telephony device 110. In this case the command instructions and relevant data can be simply relayed from the natural language processor to the command execution logic 325, 430 through internal process modules, inter-process communication (IPC), local network communication, etc. In other embodiments the command execution logic 325, 430 may reside on the mobile telephony device 110, while the natural language processor resides on the communications server 140, or vice versa. In these cases the command instructions and relevant data would need to be relayed over an available network between the communications server 140 and the mobile telephony device 110. This information can be communicated in-band in the communication link or out-of-band through another protocol common to both entities.

In a first example, the user may wish to compose and send a short message service (SMS) text message during the existing telephony call. The user may speak a phrase like "text casey running 15 minutes late". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the first word may indicate the action to take place (e.g., compose a text message), the second word may be a contact to address the text message to while the remainder of the phrase may be the content of the text message. In this case, the mobile telephony device 110 or the communications server 140 may interpret the speech as described above and instruct either the mobile telephony device 110 or the communications server 140 to compose a text message addressed to the telephone number associated with the contact named Casey on the user's behalf.

In another variant, the user may wish to compose and send a multimedia message service (MMS) message during the existing telephony call. The user may speak a phrase like "message casey running 15 minutes late". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the first word may indicate the action to take place (e.g., compose a MMS message), the second word may be a contact to address the MMS message to while the remainder of the phrase may be the audio content of the MMS message. In this case, the mobile telephony device 110 or the communications server 140 may interpret the speech as described above and instruct either the mobile telephony device 110 or the communications server 140 to compose an MMS audio message addressed to the telephone number associated with the contact named Casey on the user's behalf.

The previous SMS and MMS use cases may be combined such that both the audio message and interpreted text transcription are both delivered to the contact on the user's behalf.

In yet another variant, if the user attempts to message a contact through SMS or MMS and the contact address does not support those services, for example a POTS PSTN device, the message could be delivered to the contact by the mobile telephony device 110 or communications server 140 by it placing a separate automated call to the contact which would deliver the audio content of the message received in the user's original voice command.

In a second example, the user may wish to add an event to the calendar. The user may speak a phrase like "Sync with Tom tomorrow at 2 PM". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the natural language processing may infer a calendar entry based on the wording, syntax and context of the spoken phrase. The word sync implies a meeting. Thus, the spoken phrase may be interpreted as add a calendar entry for a meeting between Tom and I tomorrow at 2 PM. Instructions or commands to perform the task may cause the mobile telephony device 110 or communications server 140 to create a calendar entry on the user's behalf using the information provided in combination with any default values or features used to create calendar entries. For instance, if not specified in the spoken phrase, the duration of the meeting may be set to a default value—say 30 minutes. Similarly, a reminder may be set for 10 minutes prior to the meeting. The location of the meeting may be left blank. A more detailed spoken phrase may appear as, "Sync with Tom tomorrow at 2 PM for one hour in conference room B, set reminder for 30 minutes before meeting."

In another variant, the user may wish to be reminded of something. The user may speak a phrase like "Remind me to call Tom back at 2 PM" or "Remind me to research Company A after this call". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the natural language processing may infer a reminder based on the wording, syntax and context of the spoken phrase. Thus, the spoken phrase may be interpreted as add a reminder entry to a calendar, set a reminder alarm, or may remind the end user at the specified time via other means, for example, SMS text message with the specific details at the specified time.

In a third example, the user may wish to record a portion of the existing telephony call. The user may speak a phrase like "Record next 30 seconds of call". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the user may be about to receive a shopping list and does not have the ability to or want write it down. If the portion of the conversation can be recorded, there is no need to remember or write down the list. In this case, the communications server 140 may interpret the speech as described above and instruct the mobile telephony device 110 to record to an audio file the next 30 seconds of the existing telephony call. A first variant to this may be a spoken phrase simply stating "Record" which may be interpreted as a command to record the remainder of the existing telephony call. Another variant to this may be a spoken phrase stating "Record and transcribe next 30 seconds of call" which may be interpreted as a command to record the next 30 seconds of the existing telephony call and to also perform a speech to text transcription that may be saved as a text file and accessed following termination of the existing telephony call. The recorded portion of the existing telephony call may then be stored or delivered to at least one of the end user communication device that generated the trigger event, another end user communication device, the communications server, or an external server or resource accessible to the end user. If the recorded portion of the existing telephony call is transcribed, the transcription may also be stored or delivered to at least one of the end user communication device that generated the trigger event, another end user communication device, the communications server, or an external server or resource accessible to the end user.

In a fourth example, the user may wish to map a location while on a call. For instance, the parties may be talking about meeting at a new restaurant. The user may speak a phrase like "Find DeBellas restaurant". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to search for a restaurant called DeBellas and pull an address from the listing. The address may then be fed into a map application for access once the existing telephony call is complete. Variants of this use case may include, "Driving directions to DeBellas" or "Locate 1233 West Elm St." The former may automatically queue driving directions to the desired location while the latter may pinpoint a specific address on a map.

In a fifth example, the user may wish to control the device's mute function without having to interact with a soft-button on a user interface. The user may speak a phrase like "mute" or "silence". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to prevent delivery of the mobile telephony device's 110 telephony audio media stream from the communications server 140 to the other end user communication device 150. The microphone on the mobile telephony device 110 may remain active so as to allow audio input to reach the communications server 140 for natural language processing and interpretation. In this manner, an "unmute" command may be given without having to re-initiate command mode using the tap technique.

In a sixth example, the user may wish to add another party to the existing telephony call. For instance, the parties may be talking and wish to add a third party to the call without having to manually interact with a visually based user interface to do so. The user may speak a phrase like "Add Jim Mathews to call". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to look up Jim Mathews in a contact database. Alternatively, the communications server 140 may have direct access to the mobile telephony device's contact database. If Jim Mathews has multiple numbers, the spoken phrase may be augmented to "Add Jim Mathews to call, mobile number" or the like. The mobile telephony device 110 may then pass the contact number to the communications server 140 or the communications server 140 may already have the number. The communications server 140 may then initiate a separate call leg to the number associated with Jim Mathews. If a connection is established, the communications server 140 may then bridge the new call leg into the existing telephony call.

In another variant, the spoken phrase may be "Transfer call to Jim Mathews, mobile number." This scenario is the same as above except that the call leg associated with the transferring party is terminated once the new call leg is bridged into the existing telephony call.

In yet another variant, the spoken phrase may be "Transfer call to laptop." This scenario is the same as above except that the call leg associated with the transferring party is terminated once the new call leg to the specified device is bridged into the existing telephony call.

In a seventh example, the user may wish to send an email message while on a call. For instance, the user may speak a phrase like "send email to Jurves Clyde, primary email address, meet at 5:45 in lobby of hotel for dinner tonight". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to compose an email message to Jurves Clyde using the primary email address associated with his contact information. The subject and body of the email may be parsed from the spoken phrase. For instance, based on the context the subject of the email could be "dinner tonight" and the body could be a transcription of the part of the spoken phrase that reads "meet at 5:45 in lobby of hotel for dinner tonight". Once composed, the mobile telephony device 110 may be instructed to send the email.

In another variant, the spoken phrase may be, "send email to Jurves Clyde, primary email address, attach last photo, check out this picture". In this case the email composed may further include an instruction to attach the last photo taken by the mobile telephony device 110.

In an eighth example, the user may wish to send via SMS or MMS a link to his current location. For instance, the parties may be talking about meeting up. The user may speak a phrase like "text Shawn my current location". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to determine the current location of the mobile telephony device 110 and plot the location on a map. The map with a pin of the current location may then be captured as a URL link (or the like) and embedded into an SMS text message to, in this case, Shawn. Alternatively, the map itself may be included in an MMS message to Shawn. Shawn may be found in the contacts database of the user. The mobile telephony device 110 is then instructed to send the SMS or MMS message containing the location link or map to Shawn's telephone number.

In this use case, the communications server 140 may have access to the mobile telephony device's 110 contact database via a cloud based service. The data may be stored in the cloud and synced across multiple devices of the user. In addition, the communications server 140 may be able to compose and send the SMS text message on behalf of the mobile telephony device 110 using the telephone number of the mobile telephony device 110 as the source of the SMS text message.

In a ninth example, the user may wish to execute a financial transaction. For instance, the user may speak a phrase like "Authorize PayPal™ to send Justin twenty dollars". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to identify a source account for the withdrawal of funds. In this example it could be the user's PayPal™ account. Next, a destination for the funds may be identified. In this case, Justin is the destination and his mailing address (from the contacts database) may be used as a destination for a written check. Alternatively, the transfer could be electronic and Justin's PayPal™ account could be the destination so long as enough information is known to steer the transaction to this account. The amount of the transaction may also be determined. Here, it is twenty dollars as parsed from the speech input. Once the basic constructs of sender, receiver, and amount are determined, an authorization protocol may be initiated to verify the transaction. The authorization may be voice recognition based, keyword based, both, or some other technique. Lastly, the transaction may be carried out by the mobile telephony device 110 or the communications server 140.

In a tenth example, the user may wish to engage a translation feature. For instance, the parties talking may speak different languages. The user may speak a phrase like "Translate received audio from Spanish to English". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to capture all received audio from one end user device on the existing telephony call and send it to a translation processing unit accessible to the communications server 140. The translation processing unit may then translate from a first language to a second language—in this case Spanish to English. The translated audio is forwarded back to the communications server 140 where it may be passed to the mobile telephony device as the audio stream for the existing telephony call. This technique may introduce a slight delay in the audio due to translation processing. However, the inconvenience may be more than offset by the translation service that allows people that speak different languages to communicate on an existing telephony call.

In a variant, there could be two-way translation that may be initiated by a phrase such as, "Translate received audio from Spanish to English and sent audio from English to Spanish". In this variant, the audio going back may be translated from English to Spanish in case neither speaker is fluent in the other's language.

In an eleventh example, the user may wish to quickly engage a speakerphone mode without having to look the mobile telephony device 110 and find a soft-key on the display. For instance, the user may speak a phrase like "Go to speakerphone". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to switch to speakerphone mode.

In a twelfth example, the user may wish to interact with a home automation system. For instance, the user may speak a phrase like "disarm home alarm". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to engage an application residing on the mobile telephony device 110 that has access to multiple home alarm and/or automation endpoints. In this case, the security alarm system may be computer controllable to arm and disarm. The spoken phrase in this example may be interpreted to disarm the alarm system as the user arrives home and gets ready to enter the house.

In other variants, the spoken phrase may be tailored to perform other functions including, but not limited to, locking or unlocking a door, opening a garage door, switching lights on/off, and controlling a thermostat.

In a thirteenth example, the user may wish to add a new contact to a contact database associated with the mobile telephony device 110. For instance, the user may speak a phrase like "add this call under the name Paul to contacts". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to open the contacts database and add an entry called Paul. The telephone number for the entry may be the telephone number for the other user communication device on the existing telephony call. Once the existing telephony call completes, the mobile telephony device 110 may provide an indication to the user the new Paul entry has been added and provide a link to further edit the entry if desired.

In a fourteenth example, the user may wish to modulate or synthesize his voice while on the existing telephony call. For instance, the user may speak a phrase like "apply robot voice". The command execution logic 325 of communications server 140 or the command execution logic 430 of mobile telephony device 110 may process the received speech input using natural language processing to create one or more commands or instructions to be executed by either the mobile telephony device 110 or the communications server 140. In this example, the communications server 140 may interpret the speech as described above and instruct the mobile telephony device 110 to feed the audio coming from the mobile telephony device 110 into a voice synthesizer to be augmented by one or more special voice effects. In this case, the user has indicated that he wants his voice to sound like a robot. There may be multiple synthesized or modulated voice effects to choose from.

In a variant, the user may speak a phrase like "apply airport background", "apply stadium background", or "apply beach background" to place the user's spoken audio over a customized audio background to make it sound like the user has originated a call from a particular location.

It should be noted and re-iterated that the communications server 140 may be able to perform many of the functions attributed to the mobile telephony device 110 provided it has access to the same data and or applications. In some use cases the communications server 140 may have access to data and applications that the mobile telephony device 110 does not. Similarly, there may be use cases where the mobile telephony device 110 may have access to data and applications that the communications server 140 does not.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. At least one machine-readable non-transitory medium for responding to voice commands within an existing telephony call between two or more end user communication devices mediated by the IP based communications server, the at least one machine-readable non-transitory medium comprising a set of instructions that in response to being executed on a computing device cause the computing device to:

mediate a telephony call among the two or more end user communication devices, each end user communication device with its own communication link to the IP based communications server;

detect a user initiated trigger event within the existing telephony call from one of the end user communication devices;

upon detecting the user initiated trigger event: (i) causing the end user communication device that generated the trigger event to enter a temporary mute mode with respect to the existing telephony call; and (ii) receive voice input over the communication link from the end user communication device that generated the user initiated trigger event;

parse the received voice input into one or more voice commands; and cause the one or more voice commands to be executed.

2. The at least one machine-readable non-transitory medium of claim 1, further comprising:

cause a first acknowledgment to be presented to the end user communication device that generated the user initiated trigger event so as to inform an end user that voice input entered into the end user communication device that generated the user initiated trigger event will be processed as command input while in temporary mute mode.

3. The at least one machine-readable non-transitory medium of claim 2, the first acknowledgment comprising an audible tone.

4. The at least one machine-readable non-transitory medium of claim 2, the first acknowledgment comprising a haptic feedback or a vibration.

5. The at least one machine-readable non-transitory medium of claim 2, further comprising:

determine if any end user voice input has been received since the end user communication device that generated the user initiated trigger event was placed into temporary mute mode;

if no end user voice input has been received since the end user communication device that generated the user initiated trigger event was placed into temporary mute mode within a pre-determined time-out period, exiting temporary mute mode and resuming normal communications for the existing telephony call; and cause a second acknowledgment to be delivered to the end user communication device that generated the user initiated trigger event so as to inform an end user that the end user communication device that generated the user initiated trigger event has exited temporary mute mode.

6. The at least one machine-readable non-transitory medium of claim 1, further comprising:

determine if any end user voice input has been received since the end user communication device that generated the user initiated trigger event was placed into temporary mute mode;

if end user voice input has been received since the end user communication device that generated the user initiated trigger event was placed into temporary mute mode, exiting temporary mute mode and resuming normal communications for the existing telephony call following a pre-determined time-out period after the end of the voice input; and cause a second acknowledgment to be delivered to the end user communication device that generated the user initiated trigger event so as to inform an end user that the end user communication device that generated the user initiated trigger event has exited temporary mute mode.

7. The at least one machine-readable non-transitory medium of claim 1, the user initiated trigger event comprising a non-verbal acoustic signature comprising sounds made when tapping the external housing of the end user communication device.

8. The at least one machine-readable non-transitory medium of claim 7, the non-verbal acoustic signature comprising a time constrained pattern of the tap sounds.

9. The at least one machine-readable non-transitory medium of claim 1, the communication link between the end user communication device that generated the user initiated trigger event and the IP based communications server comprising an Internet Protocol (IP) connection over an 802.11 WiFi access point.

10. The at least one machine-readable non-transitory medium of claim 1, the communication link between the end user communication device that generated the user initiated trigger event and the IP based communications server comprising an Internet Protocol (IP) connection over a cellular network.

11. The at least one machine-readable non-transitory medium of claim 1, the communication link between the end user communication device that generated the user initiated trigger event and the IP based communications server comprising a circuit switched connection over a cellular network.

12. The at least one machine-readable non-transitory medium of claim 11, the circuit switched connection over a cellular network comprising at least one of a Global System for Mobile Communications (GSM) network or a Code Division Multiple Access (CDMA) network.

13. The at least one machine-readable non-transitory medium of claim 1, the communication link between the end user communication device that generated the user initiated trigger event and the IP based communications server comprising a circuit switched connection over a Public Switched Telephone Network (PSTN).

14. The at least one machine-readable non-transitory medium of claim 1, wherein the one or more voice commands are comprised of instructions to:

compose a short message service (SMS) message, the SMS message including at least one recipient identifier and SMS content; and send the SMS message on behalf of an end user that generated the user initiated trigger event to the at least one recipient identifier.

15. The at least one machine-readable non-transitory medium of claim 1, wherein the one or more voice commands are comprised of instructions to:

compose a calendar entry comprised of one or more of an event name, a date, any participants, and a time; and enter the calendar entry into a calendar application on behalf of an end user that generated the user initiated trigger event.

16. The at least one machine-readable non-transitory medium of claim 1, wherein the one or more voice commands are comprised of instructions to:

record a portion of the existing telephony call for a specified period of time; and perform at least one of storing or delivering the recorded portion of the existing telephony call to at least one of the end user communication device that generated the user initiated trigger event, another end user communication device, the communications server, or an external server or resource accessible to the end user.

17. The at least one machine-readable non-transitory medium of claim 1, wherein the one or more voice commands are further comprised of instructions to:

transcribe a portion of the existing telephony call; and perform at least one of storing or delivering the transcription of the portion of the existing telephony call to at least one of the end user communication device that generated the user initiated trigger event, another end user communication device, the communications server, or an external server or resource accessible to the end user.

18. The at least one machine-readable non-transitory medium of claim 1, wherein the one or more voice commands are comprised of instructions to:

map an address, location, or landmark using a mapping application on the end user communication device that generated the user initiated trigger event.

19. The at least one machine-readable non-transitory medium of claim 1, wherein the one or more voice commands are comprised of instructions to:

mute or un-mute the end user communication device that generated the user initiated trigger event with respect to the ongoing telephony call.

20. The at least one machine-readable non-transitory medium of claim 1, wherein the one or more voice commands are comprised of instructions to:

create an additional call leg to another end user communication device; and join the additional call leg with the existing telephony call.

21. The at least one machine-readable non-transitory medium of claim 1, wherein the one or more voice commands are comprised of instructions to:

create an additional call leg to another end user communication device;

join the additional call leg with the existing telephony call; and terminate the end user communication device that generated the user initiated trigger event from the existing telephony call.

22. The at least one machine-readable non-transitory medium of claim 1 wherein the one or more voice commands are comprised of instructions to:
compose an email message, the email message including at least one recipient email address; and
send the email message on behalf of an end user that generated the user initiated trigger event to the at least one recipient email address.

23. The at least one machine-readable non-transitory medium of claim 1, wherein the one or more voice commands are comprised of instructions to:
compose one of a short message service (SMS) or multimedia messaging service (MMS) location message, the location message including at least one recipient identifier and one of a location link or map indicative of the current physical location of the end user communication device that generated the user initiated trigger event; and
send the location message on behalf of an end user that generated the user initiated trigger event.

24. The at least one machine-readable non-transitory medium of claim 1, wherein the one or more voice commands are comprised of instructions to:
perform a financial transaction comprising:
identifying a source for withdrawal of funds;
identifying a destination for deposit of funds;
determining an amount to transfer;
authenticating the transaction; and
causing the transfer of funds to occur.

25. The at least one machine-readable non-transitory medium of claim 1, wherein the one or more voice commands are comprised of instructions to:
engage a translation feature that:
captures audio from at least one end user communication device in a first language;
translates the captured audio to a second language;
plays the translated audio to another end user communication device.

26. The at least one machine-readable non-transitory medium of claim 1, wherein the one or more voice commands are comprised of instructions to:
enter speakerphone mode on the end user communication device that generated the user initiated trigger event.

27. The at least one machine-readable non-transitory medium of claim 1, wherein the one or more voice commands are comprised of instructions to:
remotely engage one or more end point devices connected to a network;
cause one or more of the end point devices connected to the network to perform a function, the function including at least one of:
unlocking a door;
opening a garage door;
arming or disarming an alarm system;
switching a light; and
controlling a thermostat.

28. The at least one machine-readable non-transitory medium of claim 1, wherein the one or more voice commands are comprised of instructions to:
add a new contact to a contact database on behalf of an end user that generated the user initiated trigger event.

29. The at least one machine-readable non-transitory medium of claim 1, wherein the one or more voice commands are comprised of instructions to:
apply an overlay to audio coming from the end user communication device that generated the user initiated trigger event to modify the natural sound of one of a user's voice or a background.

* * * * *